United States Patent [19]
Ty

[11] Patent Number: 4,783,000
[45] Date of Patent: Nov. 8, 1988

[54] TEMPERATURE RESPONSIVE FLOW CONTROL VALVE APPARATUS

[75] Inventor: Henry Ty, Attleboro, Mass.

[73] Assignee: Texas Instruments Incorporated, Dallas, Tex.

[21] Appl. No.: 98,094

[22] Filed: Sep. 17, 1987

[51] Int. Cl.$^4$ .................................. G05D 23/08
[52] U.S. Cl. .................. 236/93 R; 74/473 R; 236/101 D; 248/73; 251/310
[58] Field of Search .......... 236/93 R, 101 D; 251/310, 117; 74/473 R; 248/73

[56] References Cited

U.S. PATENT DOCUMENTS

| | | | |
|---|---|---|---|
| 1,923,128 | 8/1933 | Ulbery | 236/93 R X |
| 2,021,428 | 11/1935 | Peo | 236/93 R X |
| 2,226,200 | 12/1940 | Donnelly | 236/93 R X |
| 2,244,808 | 6/1941 | Scott et al. | 236/93 R X |
| 2,703,582 | 3/1955 | Stepanian | 251/117 X |
| 3,008,697 | 11/1961 | Dermond | 236/93 R X |
| 3,561,487 | 2/1971 | Reed, Jr. | 251/310 X |
| 4,502,607 | 3/1985 | Ty | 236/101 E X |
| 4,560,126 | 12/1985 | Judkins et al. | 248/73 X |

FOREIGN PATENT DOCUMENTS 1299063  6/1961  France ................ 236/93 R

Primary Examiner—William E. Tapolcai
Attorney, Agent, or Firm—John A. Haug; James P. McAndrews; Melvin Sharp

[57] ABSTRACT

A temperature responsive valve particularly adapted for use in a manual valve of a vehicular automatic transmission control is shown in which the temperature responsive valve has a generally cylindrical housing with a reduced diameter section and a cylindrical valve element rotatably received in the reduced diameter section. A thermostatic coil is coupled to the valve element to control the angular position of the valve element. Apertures are provided in both the housing and the valve element forming a variable orifice for pneumatic fluid which flows into an open end of the housing and out of a minimum fixed orifice in the reduced diameter section and, depending on the temperature, may also flow through the variable orifice.

8 Claims, 3 Drawing Sheets

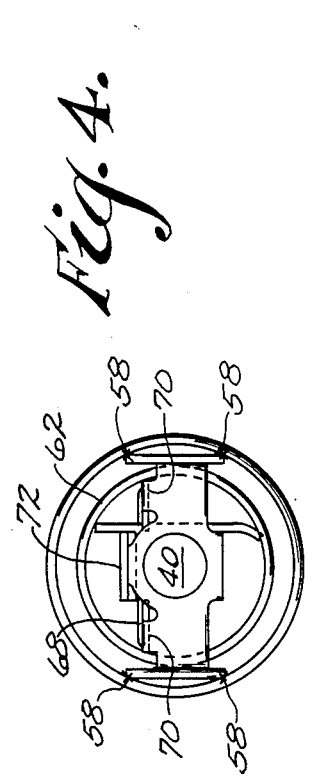
Fig. 4.
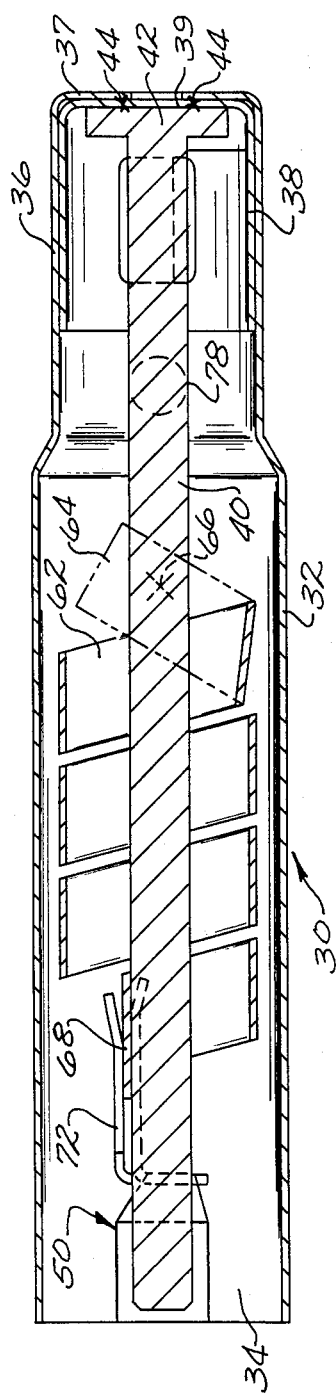
Fig. 2.
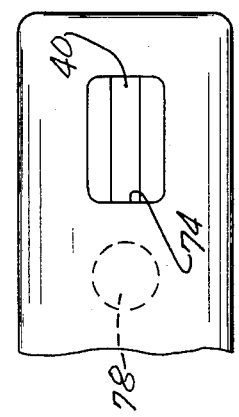
Fig. 3.
Fig. 2a.

TEMPERATURE RESPONSIVE FLOW CONTROL VALVE APPARATUS

BACKGROUND

This invention relates generally to hydraulic control systems and more specifically to a temperature responsive valve which can be used to modify the operation of a manual control valve.

In automotive automatic transmissions it is conventional to use a torque converter to couple engine power to the gear train through oil dependent upon the position of the transmission selector lever. Typically the transmission quadrant has six positoins including P (park), R (reverse), N (neutral), D (drive), I (intermediate) and L (low). The selector lever is mechanically coupled to a manual valve which is adapted to bring various hydraulic lines into and out of communication depending on the position selected. For example, when the transmission selector lever is moved to the drive position the manual valve moves to allow line pressure to be delivered to the forward clutch. The oil is metered to the forward clutch piston through an orifice to provide a smooth application of the clutch. However, as the transmission fluid warms up and becomes less viscous, the fluid flow becomes excessive and causes uneven shifting. This is particularly noticeable when shifting from reverse to drive. In U.S. Pat. No. 4,502,627, assigned to the assignee of the present invention, a temperature responsive flow control valve for use in a transmission is disclosed and claimed which compensates for temperature change to maintain fluid flow at a constant level and thereby provide smooth shifting. The flow control valve comprises a base having a first orifice of a selected minimum area and second parallel pasageway in the form of an elongated slot oriented to lie along an arc of movement of a thermostat metal element carrying a flag which slides on the base so that very small angular movement of the element causes the flag to cross over the entire width of the slot shaped orifice making adjustments in the effective orifice size as the temperature varies between two reference points. Although this valve mechanism is very effective its physical configuration is such that it can be used only in certain locations. That is, the arrangement of parts makes it unsuitable for use in small cylindrical passageways, for example.

SUMMARY OF INVENTION

There are many existing transmission systems which have fixed control orifices and which therefore are adversely affected by temperature variations. It is an object of the present invention to provide a temperature responsive flow control valve which can be used with transmission systems without requiring a change in design and tooling for the transmission housing. It is another object of the invention to provide a temperature responsive valve which can be placed within a passageway of a manual valve presently used in transmission systems. Yet another object is the provision of an inexpensive yet reliable temperature responsive valve. Other objects and features of the invention will become more readily understood from the following detailed description and appended claims when read with the accompanying drawings in which like reference numerals designate like parts throughout the figures thereof.

Briefly, in accordance with the invention a valve having a generally cylindrical housing of a size selected to fit closely in a cylindrical passageway formed in a manual valve has a first open end for reception of pneumatic fluid, a reduced diameter section and a second end with an end wall. A cylindrical valve element having an end wall is closely received in the reduced diameter section and is adapted for rotation within the housing. A shaft has one end fixedly secured to the end wall of the valve element and extends to the open end of the housing where it is supported by a bracket mounted at the open end thereof. The bracket has a central bearing portion with a pair of tabs extending therefrom in an outwardly direction relative to the housing and are fixedly secured thereto. A pair of fingers extend from the central bearing portion in an inward direction relative to the housing and lie in a first plane which is parallel to the longitudinal axes of the cylindrical housing. A third finger, intermediate the pair, extends from the central bearing portion in the inward direction and lies in a second plane parallel to the first but spaced therefrom a distance slightly greater than the thickness of a flat tab extending from an end of a thermostatic helical coil. The coil, which has a flat tab at each opposite end, is mounted on the shaft with one end fixedly attached to the shaft and the other end attached to the bracket with the tab received in the space between the fingers so that it is fixed relative to its angular position but is free to move radially outwardly and inwardly as the thermostatic coil expands and contracts with changes in temperature. A first aperture is formed in the side wall of the reduced diameter section of the housing and a second aperture is formed in the cylindrical wall of the valve element in alignment with each other relative to their position along the longitudinal axis of the cylindrical housing. The first and second apertures form a variable orifice whose size is dependent upon the angular position of the valve element which is determined by the temperature of the coil. Another aperture is formed in the reduced diameter section, out of alignment with the valve element, to serve as a fixed orifice to provide a selected minimum control orifice with the variable orifice providing a parallel path with a variable controlled cross sectional area at temperatures below a selected level.

BRIEF DESCRIPTION OF THE DRAWINGS

FIG. 2 is a cross sectional view taken along the longitudinal axis of the temperature responsive flow control valve, FIG. 2a is a back elevational view of a portion of the FIG. 2 valve, FIG. 3 is a left side view of the FIG. 2 valve, FIG. 4 is a right side view of the FIG. 2 valve.

DESCRIPTION OF PREFERRED EMBODIMENT

Figure 1:
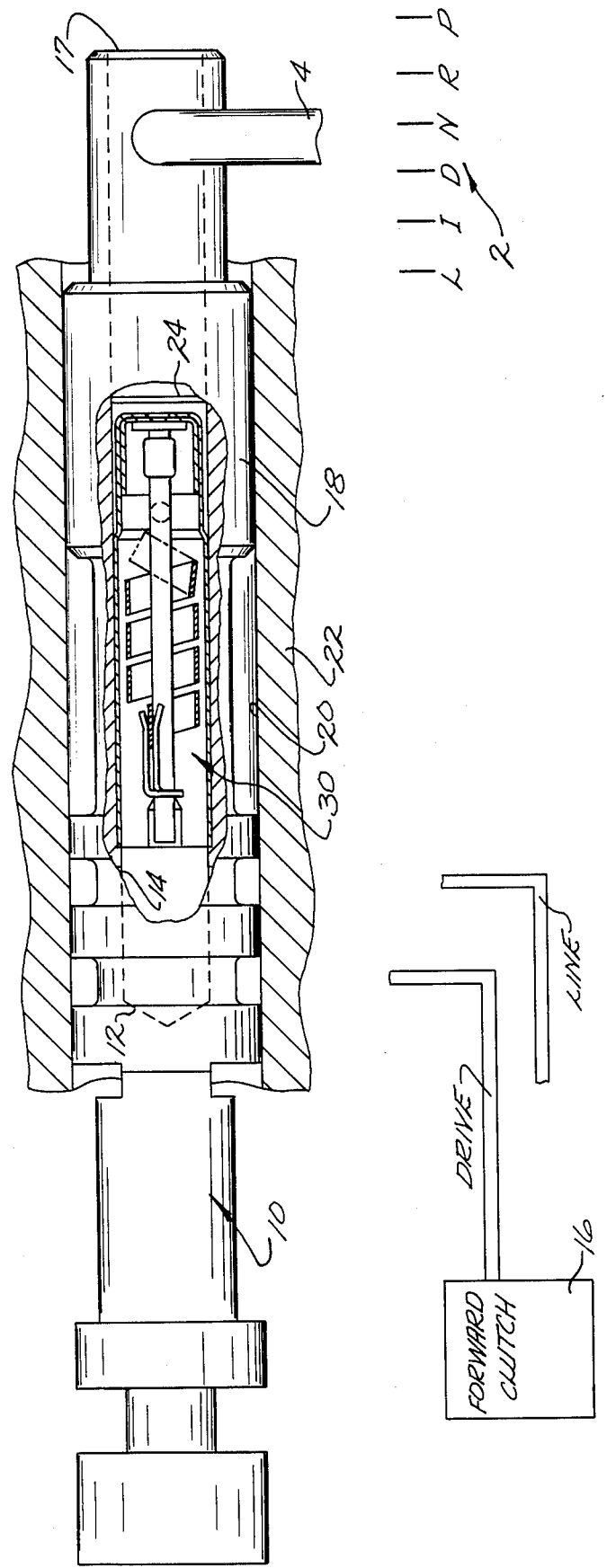
FIG. 1 is a schematic representation of an automotive transmission control including the quadrant, manual valve, temperature response flow control valve, forward clutch and pneumatic lines.
Figure 5:
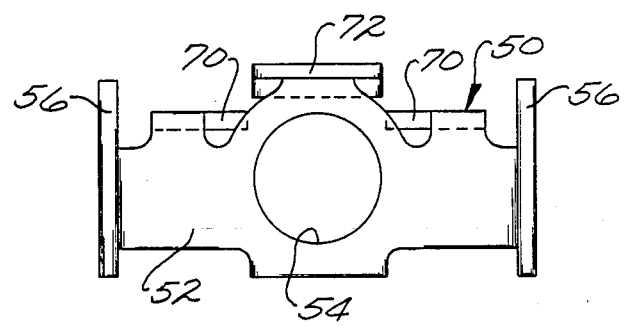
FIG. 5 is an enlarged side view of a bracket shown in FIGS. 2 and 3.
Figure 6:
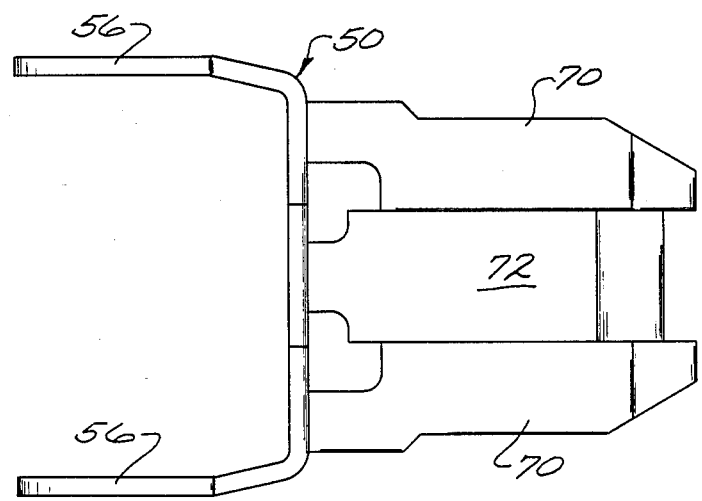
FIG. 6 is a top plan view of the bracket of FIG. 5.

With reference to FIG. 1 an automatic transmission control utilizing a temperature responsive flow control valve made in accordance with the invention is schematically shown. A quadrant 2 having six positions: park (P), reverse (R), neutral (N), drive (D), intermediate (I) and low (L) is shown in the neutral position. The manual selector lever 4 is coupled to a manual valve 10 which controls communication among hydraulic lines such as drive and line passages and forward clutch 16 schematically shown in the figure by virtue of its axial position in bore 20 of casing 22. Manual valve 10 is formed with bores 12, 14, an open end 17 and an intermediate passageway 18 therebetween for passage of hydraulic fluid therethrough.

A temperature responsive flow control valve 30 is disposed within intermediate passage 18 locked therein by lock washer 24 and is adapted to permit the passage of hydraulic fluid as will be explained in detail below.

As seen in FIGS. 2–4, valve 30 comprises a generally cylindrical housing 32 having a diameter such that the valve closely fits within passageway 26. Housing 32 has an open end 34 at one end and a reduced diameter section 36 at its opposite end culminating at end wall 37.

A generally cup shaped valve element 38 having an end wall 39 and a cylindrical horizontal axis coincident with the horizontal axis of cylindrical housing 32 is slidingly received in section 36 and is adapted to rotate around its horizontal axis as will be explained below.

A shaft 40 extends essentially the entire length of housing 32 and has a head portion 42 formed at one end thereof which is fixedly connected to end wall 39 in any suitable manner, as by welding at 44 (FIG. 2). The opposite end of shaft 40 is supported by a bracket 50. Bracket 50 is formed with a bearing section 52 formed with a bore 54 adapted to receive shaft 40 and a pair of parallel disposed tabs 56 extending in a first direction toward open end 34 from opposite lateral ends of bearing section 52. Tabs 56 are fixedly attached to housing 32 in any suitable manner, as by welding at 58 (FIG. 3) to mount shaft 40 with wall 39 of valve element 38 contiguous with end wall 37. An aperture 60 is preferably provided in end wall 37 to allow air to escape when valve element 38 is inserted in section 36.

Bracket 50, in addition to supporting an end of shaft 40 also mounts one end of a thermostatic element 62. Thermostatic element 62 is formed into a helix with one end 64 formed into a flat tab portion fixedly attached to shaft 40 in a conventional manner, as by welding at 66 and an opposite end 68 formed into a flat tab portion fixedly mounted to bracket 50 with regard to its angular position but slidingly received with regard to movement inwardly and outwardly in a radial direction. A pair of fingers 70 extend from bearing section 52 in a second direction toward end wall 37, opposite to the direction tabs 56 extend, and lie in a first plane parallel to the horizontal axis of shaft 40. A third finger 72 extends from section 52 in the second direction and lies in a second plane parallel to the first plane but spaced therefrom a distance slightly greater than the thickness of tab portion 68 of thermostatic element 62. This arrangement allows radial sliding motion and eschews skewing forces from being placed on cup shaped element 38 which would tend to bind the element and cause erratic sliding motion.

Reference may be had to copending application Ser. No. 861,382, assigned to the assignor of the present invention, which issued as U.S. Pat. No. 4,726,452, for a showing of another mounting arrangement to provide radial sliding motion for an end of a thermostatic helical coil. In that arrangement the coil is mounted on a pin with one end fixed to the pin as by welding and its opposite end is captured in such a way that the outer end is allowed to move in a radial direction in a slot in order to permit consistent, predictable rotation movement of the pin.

A first generally rectangular valve aperture 74 is formed in the side wall of reduced diameter section 36 and a second generally rectangular valve aperture 76 is formed in the side wall of valve element 38. The length of aperture 76 in the direction of the longitudinal axes is preferably slightly longer than the corresponding length of aperture 74 to facilitate providing a consistent opening from one device to the next in the event of a slight misalignment in the axial direction.

The combination of apertures 74, 76 results in a variable orifice the size of which is dependent upon the angular position of shaft 40. This in turn is dependent upon the temperature of the thermostatic element 62 which expands or contracts as its temperature changes. Such expansion or contraction causes rotational movement of shaft 40 and concomitantly valve element 38.

In a device made in accordance with the invention, the thermostatic element and the sizes of the apertures 74, 76 were chosen so that the variable orifice is fully closed at 110 deg. F. and remains closed up to 400 deg. F., the variable orifice is fully opened at 0 deg. F. and remains open down to minus 40 deg. F.

In order to provide a minimum size passageway a separate bore 78 is provided in the reduced diameter portion 36 spaced from valve element 38 in the direction of the horizontal axis. Thus pneumatic fluid enters open end 34 of valve 30 and passes through fixed orifice 78 into passageway 26 and, depending on the temperature of the fluid, through the variable orifice formed by apertures 74, 76.

A valve made in accordance with the invention has a housing 30 and valve element 38 both formed of type 305 stainless steel 0.010 inch in thickness. Shaft 40 is formed of type 430 stainless steel and bracket 50 is formed of type 304 stainless steel 0.012 inch thick. The length of valve 30 is 1.575 inches and the outer diameter 0.3355 inch and the outer diameter of the reduced diameter section 36 is 0.279 inch. Clearance between reduced diameter section 36 and valve element 38 is 0.005 inches. Bore 78 comprising the fixed orifice is 0.086 inch in diameter. The vertical heights, as shown in FIG. 2 of aperture 74 in housing 32 is 0.102 and of aperture 76 in valve element 38 is 0.142 while the widths in direction of the longitudinal axis of the housing and element are 0.161 and 0.181 inches respectively. The thickness of the flat tabs is 0.008 inch while the space between the planes in which fingers 70, 72 lie is 0.0095 inch.

Although the invention has been described with respect to a specific embodiment, variations and modifications will become apparent to those skilled in the art. It is the intent that the appended claims be interpreted as broadly as possible in view of the prior art to include all such variations and modifications.

What is claimed:

1. A vehicular automatic transmission control in which a manual valve member is movably positioned among different locations to bring selected pneumatic lines into and out of communication with each other in which the manual valve member has a passageway having a selected cross section; the passageway having an inlet and an outlet adapted to be brought into alignment with openings in the pneumatic lines, characterized in that a temperature responsive valve having at least a portion with a cross section essentially matching the cross section of the passageway is disposed in the passageway, the temperature responsive valve comprising a generally cylindrical housing having an open end and a reduced diameter side wall section, an aperture being formed in the side wall section, a cup shaped valve element disposed in the reduced diameter section, the valve element having an end wall and an integral cylindrical side wall, an aperture being formed in the side wall of the valve element disposed in alignment with the aperture in the side wall of the reduced diameter section in a direction along the longitudinal axis of the cylindrical housing, temperature responsive means including a thermostatic element coupled to the valve element and adapted to rotate the valve element to slide the side walls relative to one another and move the apertures into and out of angular alignment to form a variable orifice, the size of the orifice being based on the temperature of the temperature responsive means, the thermostatic element being configured as a helical coil, a shaft fixedly attached to the end wall of the valve element and extending along the longitudinal axis of the cylindrical housing, a bracket disposed in the open end of the cylindrical housing and being adapted to support the shaft, the helical coil having one end fixedly secured to the shaft and having a flat tab on an opposite end attached to the bracket so that the tab is fixed angularly but is free to move in a radial direction as the coil expands and contracts due to temperature changes.

2. A vehicular automatic transmission control according to claim 1 further characterized in that a minimum fixed orifice is provided in the section having a reduced cross sectional area.

3. A vehicular automatic transmission control according to claim 1 further characterized in that the bracket has a central bearing portion, a shaft receiving bore is formed in the central bearing portion, a pair of tabs extend in a first direction toward the open end of the cylindrical housing from the central bearing portion, the tabs fixedly connected to the open end portion of the housing, a pair of fingers extend from the central bearing portion in a second direction toward the end wall of the cylindrical housing and lie in a first plane parallel to the longitudinal axis of the cylindrical housing, a third finger, intermediate the pair of fingers, extends from the central bearing portion in the second direction and lies in a second plane parallel to the first plane, the first and second planes being spaced apart a distance slightly greater than the thickness of the flat tab.

4. A valve element comprising a cylindrically shaped passageway for transmission of hydraulic fluid, a temperature responsive valve having a generally cylindrical housing side wall received and closely fitting in the passageway, the housing having first and second opposite ends, the first end being open and the second end having an end wall, the housing having a longitudinally extending reduced diameter section extending from the end wall, a valve element having a cylindrically shaped side wall and an end wall closely fitting within the reduced diameter section, a shaft fixedly attached to the end wall of the valve element and extending essentially to the open end of the housing, a bracket disposed in the open end of the housing supporting the shaft, a thermostatic helical coil having first and second ends with an integrally attached flat tab extending from each end, the tab at one end fixedly attached to the shaft, the tab at the other end attached to the bracket so that it is fixed relative to angular motion but slidable inwardly and outwardly as the thermostatic coil expands and contracts with temperature changes, expansion and contraction of the coil causing the shaft and valve element to rotate, an aperture formed in the side wall of the housing and the valve element in alignment with each other along the longitudinal axis of the cylindrical housing, the apertures forming a variable orifice, the size of the orifice being dependent on the angular position of the valve element.

5. A valve element according to claim 4 in which a minimum fixed orifice is provided in the section having a reduced cross sectional area.

6. A valve element according to claim 4 in which the bracket has a central bearing portion, a shaft receiving bore is formed in the central bearing portion, a pair of tabs extending in a first direction toward the first end of the housing from the central bearing portion, the tabs fixedly connected to the open end portion of the housing, a pair of fingers extending from the central bearing portion in a second direction toward the second end of the housing and lying in a first plane parallel to the longitudinal axis of the cylindrical housing, a third finger, intermediate the pair of fingers, extending from the central bearing portion in the second direction and lying in a second plane parallel to the first plane, the first and second planes being spaced apart a distance slightly greater than the thickness of the flat tab.

7. A temperature responsive valve comprising a generally cylindrical housing side wall, the housing having first and second opposite ends, the first end being open and the second end having an end wall, the housing having a longitudinally extending reduced diameter section extending from the end wall, a valve element having a cylindrically shaped side wall and an end wall closely fitting within the reduced diameter section with the end walls adjacent to one another, a shaft fixedly attached to the end wall of the valve element and extending essentially to the open end of the housing, a bracket disposed in the open end of the housing supporting the shaft, a thermostatic helical coil having first and second ends with an integrally attached flat tab extending from each end, the tab at one end fixedly attached to the shaft, the tab at the other end attached to the bracket so that it is fixed relative to angular motion but slidable inwardly and outwardly as the thermostatic coil expands and contracts with temperature changes, expansion and contraction of the coil causing the shaft and valve element to rotate, an aperture formed in each of the side wall of the housing and the valve element in alignment with each other along the longitudinal axis of the cylindrical housing, the apertures forming a variable orifice, the size of the orifice being dependent on the angular position of the valve element.

8. A temperature responsive valve according to claim 1 in which the bracket has a central bearing portion, a shaft receiving bore is formed in the central bearing portion, a pair of tabs extending in a first direction toward the first end of the housing from the central bearing portion, the tabs fixedly connected to the open end portion of the housing, a pair of fingers extending from the central bearing portion in a second direction toward the second end of the housing and lying in a first plane parallel to the longitudinal axis of the cylindrical housing, a third finger, intermediate the pair of fingers, extending from the central bearing portion in the second direction and lying in a second plane parallel to the first plane, the first and second planes being spaced apart a distance slightly greater than the thickness of the flat tab.

* * * * *